United States Patent

[11] 3,628,250

| [72] | Inventor | Mitchell E. Timin<br>San Diego, Calif. |
|---|---|---|
| [21] | Appl. No. | 866,927 |
| [22] | Filed | Oct. 16, 1969 |
| [45] | Patented | Dec. 21, 1971 |
| [73] | Assignee | The United States of America as represented by the Secretary of the Army |

[54] MECHANICAL SPHERICAL TRIANGLE COMPUTER
4 Claims, 5 Drawing Figs.

[52] U.S. Cl. .................................................. 33/1 SA,
33/75 R, 35/34
[51] Int. Cl. ............................................... B43l 13/20
[50] Field of Search .......................................... 33/1 R,
1 SA, 64 R, 75 R; 35/34

[56] References Cited
UNITED STATES PATENTS

| 943,532 | 12/1909 | French et al. ................. | 33/1 SA |
| 1,338,730 | 5/1920 | Huntington ................. | 33/1 SA |
| 2,697,234 | 12/1954 | Sturdevant .................. | 33/64 R X |

Primary Examiner—William D. Martin, Jr.
Attorneys—Harry M. Saragovitz, Edward J. Kelly and Herbert Berl ABSTRACT: Instruments for use in solving basic problems of mathematics in navigation are generally complicated and expensive. The present invention teaches a simple instrument for the purpose comprising six L-shaped members, pivoted together with a protractor at each pivot, to indicate the angle between the adjacent legs. The extended axes of the pivot members intersect at a common point, the center of a sphere. The protractors and indicia marks on the L-shaped members indicate the angles sought of the spherical triangle involved.

PATENTED DEC 21 1971
3,628,250
SHEET 1 OF 2
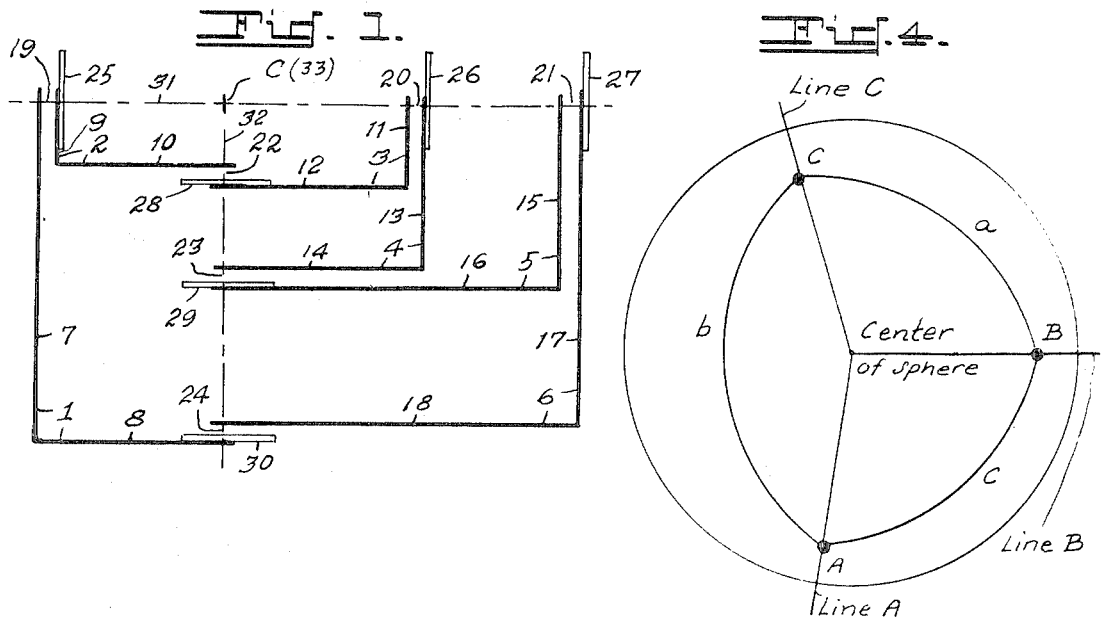
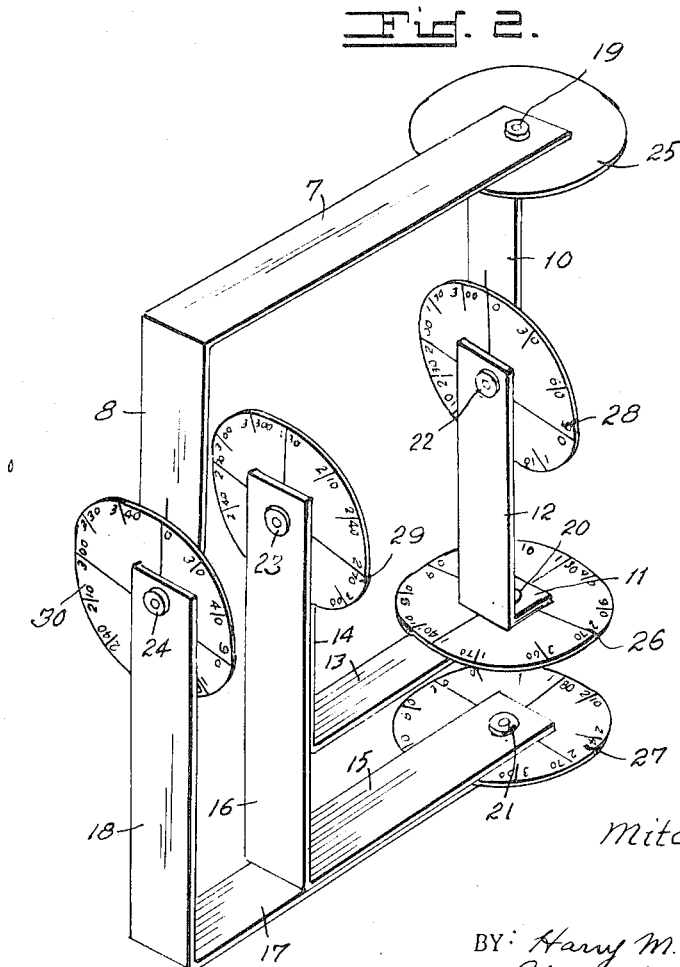
INVENTOR,
Mitchell E. Timin
BY: Harry M. Saragovitz,
Edward J. Kelly &
Herbert Berl
ATTORNEYS INVENTOR,
Mitchell E. Timin BY: Harry M. Saragovitz,
Edward J. Kelly &
Herbert Berl
ATTORNEYS

MECHANICAL SPHERICAL TRIANGLE COMPUTER

BRIEF SUMMARY

The solution of spherical triangles is the basic mathematical problem of navigation. Many devices have been devised to help solve the problem. Algebraic formulas exist for the slow painstaking procedure. And, tables have been set up to indicate the angles. As exemplary, tables known as H.O. 214 exist, (U.S. Naval Hydrographic Office), but they occupy nine large volumes for entries of one-half degree increments. For one-quarter degree tables 72 volumes would be required.

For the teacher of mathematics, the small yacht owner, or the airplane pilot, the bulky, expensive devices are undesirable. The nine or 72 volumes of tables are undesirable and the complicated, slow, laborious solution of algebraic formulas can add to the tendency to become seasick or airsick, as well as wasting valuable time and taking the attention away from other important duties. The mathematics instructor needs apparatus to demonstrate the concepts he is teaching.

The present device is a very simple device which is inexpensive to manufacture. It folds into a very small volume for storage or shipment and is light in weight. It is very simple to set up and use and it gives all six angles by direct readings from protractors, without the use of tables or calculations or the use of formulas. A mathematics instructor finds the device to be very valuable as a teaching aid.

In the drawings:

FIG. 1 is a diagrammatic representation of the invention in one of its folded positions.

FIG. 2 is a three-quarter perspective of an embodiment in a folded position.

FIG. 4 is a diagrammatic illustration of angles and axes of a spherical triangle.

FIG. 1 illustrates six L-shaped members 1, 2, 3, 4, 5 and 6 each having two legs disposed at right angles to each other, designated as 7-8, 9-10, 11-12, 13-14, 15-16 and 17-18 respectively. Pivot members 19, 20, 21, 22, 23 and 24 respectively connect legs 7-9, 11-13, 15-17, 10-12, 14-16 and 18-8. The six L-shaped members, or twelve legs, are illustrated as folded in a plane. Protractors 25, 26, 27, 28, 29 and 30 are made integral with or are attached to legs 9, 13, 17, 12, 16 and 8 respectively.

OPERATION

For many centuries inventors have addressed themselves to the problem of making a mechanical calculator which would solve spherical triangles. The objective in all cases was the same; there had to be three mechanical inputs where given angles could be entered, and one, two or three mechanical outputs where the unknown angles would be read off. Unfortunately, the approach has usually been substantially the same, namely, the mechanical duplication of spheres and great circles. As a direct result of that approach, the devices usually have two or three large rings, representing great circles, somehow constrained to remain concentric (but not coplanar), along with several sliders and other devices to measure angles and/or complete the geometry.

Spherical surfaces and great circles are inherently clumsy to mechanize. It is, however, possible to preserve the essence of a spherical triangle while doing away completely with the sphere and its great circles. To do this it is merely necessary to work with the radii from the center of the sphere to each of the corners of the triangle. This set of three straight lines has a one-to-one ratio corresponding with the spherical triangle, and furthermore each of the six angles of the triangle is equal to a certain angle formed by the lines. Referring to FIG. 4, it is seen that the angular length of each side of the spherical triangle is equal to the angle between the two radii extending to the adjacent corners. For instance, the angle between lines A and B bears a relationship to the length of side $c$. The corner angles of the triangle are each equal to the angle between a pair of intersecting planes. Taking the radial lines two at a time, we may determine three planes, each being the plane which contains one pair of lines. Any two of these planes will meet along one of the lines and the angle between these two planes is equal to the corner angle of the triangle at the corner contained by both of the planes. For instance, corner angle A is equal to the angle between the plane of lines A and B, and the plane of lines A and C.

Figure 5:
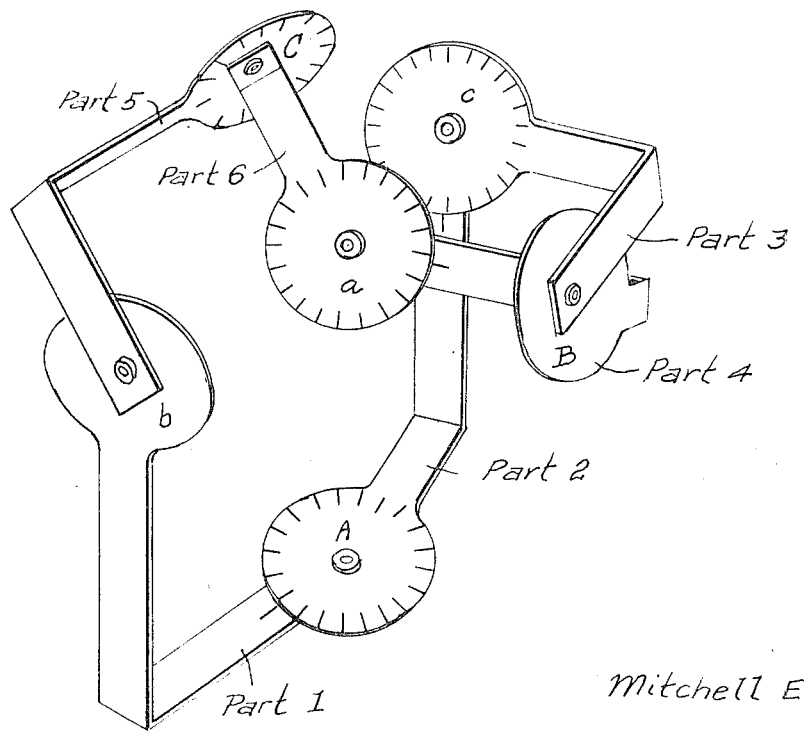
FIG. 5 is a diagrammatic illustration of an embodiment of the invention related to the angles and axes of FIG. 4.

Now we may disregard the actual spherical triangle and proceed to describe the present device, a mechanical model of three intersecting lines, along with readout devices for the angles between the lines and the angles between planes formed by the lines. FIG. 5 illustrates the mechanical spherical triangle calculator related to the angles and axes referred to in FIG. 4. The instrument is composed of six similar parts, each of which is pivotally connected to two others. At each pivot there is a dial, which is simply a protractor, that indicates the angular displacement of one part with respect to the other. The two pivot axes of each part are at right angles. (By pivot axis is meant the axis of rotation of a part with respect to another to which it is pivotally connected.) The axes of all six pivots, when extended, meet at a common point, representing the center of the sphere and the point of intersection of the three radial lines.

The pivot axis of the protractor labeled A is represented by line A of FIG. 4. Likewise the pivot axes of protractors B and C are represented by lines B and C respectively. It is, therefore, these three pivot axes which duplicate the geometry of the three radial lines discussed above. Note that each pivot axis considered as a line, is immobile with respect to either of the two parts for which it is the pivot axis. Pivot axis A is immobile with respect to part 2, and pivot axis B is immobile with respect to part 3, therefore, the angular rotation of lines A and B. Consequently, if the zero mark is correctly located, the protractor labeled $c$ will read the angle between lines A and B, which is equal to angle $c$ of the spherical triangle. Similarly, pivot axis B is immobile with respect to part 4 and pivot axis C is immobile with respect to part 6. Therefore, the protractor labeled $a$, which reads relative angular displacement of parts 4 and 6, will also read the angle between lines B and C, which is equal to angle $a$. By the same reasoning protractor $b$ will read the angle between lines A and C, which is the angle $b$.

It is now necessary to observe that pivot axis $c$ is perpendicular to the plane passing through lines (pivot axes) A and B. This is because pivot axes A and B are individually constrained to be perpendicular to pivot axis $c$ by the rigidity of parts 2 and 3. Likewise, pivot axis $b$ is perpendicular to the plane passing through lines A and C, and pivot axis $a$ is perpendicular to the plane passing through lines B and C. Since the angle between their perpendiculars, the angle between pivot axes $b$ and $c$ must be equal to the angle between the plane of lines A and B and the plane of lines A and C. This is equal to corner angle A of the spherical triangle. Now, since pivot axis $c$ is immobile with respect to part 2 and pivot axis $b$ is immobile with respect to part 1, and since protractor A reads the relative rotation of parts 1 and 2, protractor A will read the angle between pivot axes $b$ and $c$, and hence angle A. Similarly, the angle between pivot axes $a$ and $b$ is equal to angle C, the angle between the plane of lines B and C and the plane of lines A and C. Protractor C will hence read angle C, since it reads the relative rotation between pivot axes $a$ and $b$. Likewise, protractor B will read corner angle B of the spherical triangle.

As demonstrated by the foregoing paragraphs, each of the six protractors of the device will at all times read in such a way as to correspond to the six angles of some spherical triangle. Furthermore, protractor B must correspond to angle B, protractor $b$ to angle $b$, and so on. Since any three angles determine a spherical triangle, the setting on any three of the protractors determines the configuration of the device and the reading of the other three protractors.

The practical version of the device may be equipped with friction brakes or locks on each protractor, so that a setting can be maintained once it is entered. In use, all six locks would be initially released, allowing free movement. As each of the three given angles is entered on the corresponding protractor, the lock on that protractor would be set so as to maintain that setting. As long as only one or two locks have been set the device will be movable, but as soon as the third lock is set it will become rigid. The three unknown angles may then be read off of their respective protractors.

A high precision version of the device should have ball bearings at all the pivot axes, to eliminate distortion of the members due to frictional torques. This is because the mechanism is subject to a kind of gimbal lock in certain positions, which has the effect of magnifying the applied force needed to overcome friction when the parts are positioned. Plain bearings will be satisfactory for moderate levels of precision. A high precision device will also need more sophisticated readout devices than a simple protractor. A vernier will be all that is required for many applications since it will permit readings in minutes of arc. For greater precision than afforded by a vernier protractor, either dial gauges, micrometer movements or digital counters may be employed.

The exact size and shape of the six parts is quite flexible. All that is required is that each part have its two pivot axes at right angles, and that when assembled, all pivot axes pass through a common point.

FIG. 1 diagrammatically illustrates the six L-shaped members folded in a single plane, a compact folded position of parts. It will be observed that pivots 19, 20 and 21 are in alignment and pivots 22, 23 and 24 are in alignment. The axes of these pivots are illustrated at 31 and 32 intersecting at center point C, designated 33.

FIG. 2 illustrates the actual appearance of a device similar to that of FIG. 1 but rotated ninety degrees.

Figure 3:
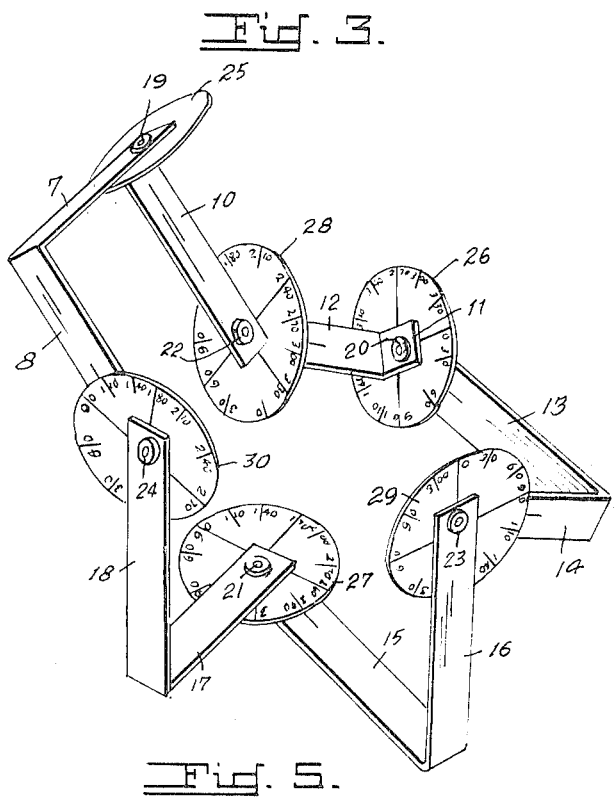
FIG. 3 is a view of the invention in one of its positions of use.

FIG. 3 illustrates one of the many possible positions of the parts. In any position of adjustment of parts the axes intersect at a single point, the center of a sphere. The angles indicated on the protractors are those for a spherical triangle. For any given spherical triangle three given angles are set on three of the protractors. The other three (unknown angles) are then read directly from the other three protractors. Tables and tedious computations are avoided.

I claim:

1. A spherical triangle computer comprising six L-shaped members having 12 legs, six pivotal connections, each interconnecting two of said 12 legs in a closed loop, a protractor at each of said pivotal connections fixed with respect to one leg, and indicia associated with the other leg such that the angle between the two legs may be read.

2. Apparatus as in claim 1 wherein each of said protractors comprises an integral part of the leg to which it is fixed.

3. Apparatus as in claim 1 wherein the legs of each L-shaped member are disposed at right angles to each other.

4. Apparatus as in claim 1 wherein the axes of all of the six pivoted connections intersect at a common point.

* * * * *